(12) United States Patent
Boehl et al.

(10) Patent No.: US 7,460,034 B2
(45) Date of Patent: Dec. 2, 2008

(54) METHOD AND DEVICE FOR CODE GENERATION IN THE TRANSMISSION OF DATA VIA A COMMUNICATIONS SYSTEM

(75) Inventors: Michael Boehl, Stuttgart (DE); Eberhard Boehl, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/578,201

(22) PCT Filed: Apr. 7, 2005

(86) PCT No.: PCT/EP2005/051556

§ 371 (c)(1),
(2), (4) Date: Jul. 10, 2007

(87) PCT Pub. No.: WO2005/099204

PCT Pub. Date: Oct. 20, 2005

(65) Prior Publication Data

US 2007/0273565 A1    Nov. 29, 2007

(30) Foreign Application Priority Data

Apr. 8, 2004  (DE) .................. 10 2004 018 095
Dec. 23, 2004 (DE) .................. 10 2004 062 010

(51) Int. Cl.
*H03M 5/00* (2006.01)

(52) U.S. Cl. .................... 341/58; 341/50; 341/51; 713/150

(58) Field of Classification Search ............ 341/50, 341/51, 58; 713/150; 714/807
See application file for complete search history.

(56) References Cited

U.S. PATENT DOCUMENTS 4,961,221 A * 10/1990 Abiven .................. 713/150
5,442,647 A *  8/1995 Loebig .................. 714/807

OTHER PUBLICATIONS

Lyuh C-G et al., "Low power bus encoding with crosslink delay elimination", Proceedings 15th Annual IEEE International ASIC/SOC Conference, Rochester, NY, USA, Sep. 25-28, 2002, Piscataway, N.J., USA, Sep. 25, 2002, pp. 389-393.
Duprat J et al., "Some results about on-line computation of functions", Proceedings of the 9th Symposium on Computer Arithmetic, 1989, Santa Monica, CA, USA, Sep. 6-8, 1989, IEEE Comput. Soc. Press, Washington, D.C., USA, Sep. 6, 1989, pp. 112-118.
"A New 8B10B Block Code for High Speed Data Transmission Over Unshielded Twisted Pair Channels", Alistair Coles, Hewlett Packard, Oct. 1996.

* cited by examiner

*Primary Examiner*—Jean B Jeanglaude
(74) *Attorney, Agent, or Firm*—Kenyon & Kenyon LLP (57) ABSTRACT

A method and a device for generating codes in the transmission of data via a communications system having at least two subscribers, in which a first subscriber receives at least one data word and forwards the data word or an at least partially changed data word to at least one second subscriber, the data being represented as bits which are able to assume two different values, and at least two bits of a data word are coded in at least three bits in such a way that in the three coded bits always at least two bits of the same value follow each other and that, after the reception of one or two of the three coded bits, one may already be able to decide which first code bit is to be emitted.

18 Claims, 6 Drawing Sheets

METHOD AND DEVICE FOR CODE GENERATION IN THE TRANSMISSION OF DATA VIA A COMMUNICATIONS SYSTEM

CROSS REFERENCE TO RELATED APPLICATIONS

This application is a 371 of PCT/EP05/51556 filed Apr. 7, 2005 which claims priority to Germany application No. 102004018095.4 filed on Apr. 8, 2008 and Germany Application No. 102004062010.5 filed on Dec. 23, 2004.

FIELD OF THE INVENTION

The present invention relates to a method and a device for code generation in the transmission of data via a communications systems having at least two subscribers, to a corresponding subscriber of the communications system, and to a corresponding computer program and computer program product.

BACKGROUND INFORMATION

Codes for the transmission of data via a communications system, especially via serial busses, differ depending on the transmission medium, the bit rate and the requirement for a timing recovery and the electromagnetic compatibility (EMC) characteristic values. For instance, in order to transmit data having up to 25 megabits/s, an optical transmission was provided in the MOST system, in order to ensure the EMC. However, in this context, electrical-optical converters are very expensive, and the plastic optical fibers used make special demands on installation in the automobile body. For this purpose, the signals in the MOST bus are coded according to the Biphase Mark Code (bifrequency code). Each information bit, in this context, is represented by two code bits. If both code bits have the same value, then this value corresponds to the value of the information bit 0. A 1 is represented by different values of the code bits. In addition, after the two code bits there always takes place a change in level, independent of the information value:

| code bits | 00 | 10 | 10 | 11 | 00 | 11 | 01 | 01 | ... |
|---|---|---|---|---|---|---|---|---|---|
| info. bits | 0 | 1 | 1 | 0 | 0 | 0 | 1 | 1 | ... |

In this context, the code has 100% redundancy compared to the message bits. However, if such a code bit sequence is transmitted via electrical lines, then, because of the frequent change of level, there takes place a large EMC emission corresponding to the bit rate (at preferably zeros) and to double the bit rate (at preferably ones). Other frequency values also come about in the frequency spectrum for the transitions between ones and zeros, without substantially attenuating the dominating two frequencies. This comes about because a level change is always called for at the bit boundaries by the coding rule. If the data are transmitted without redundancy, that is, in a binary coding having the significances 1, 2, 4, 8, etc., which may also be represented in hexadecimal coding (0×0 is equivalent to binary 0000 and 0×F is equivalent to binary 1111), this has the disadvantage that, in the first place, there does not necessarily have to be a level change (constant 0×or 0×F) or that these take place at a similar frequency as above at each bit, provided that constantly 0×5 or 0×A is transmitted. However, since there is no code redundancy in this case, but all bits are information bits, the transmission frequency may be reduced to half the value. However, in this case, this code that is used cannot have no DC component and, at the same time, does not offer the possibility of timing recovery using a PLL (phase locked loop), since there exists no specifiable maximum bit number without a level change. A phase-locked loop requires a level change for the synchronization of at least all n bits. With that, the code shows some undesired disadvantages, as was just described.

The disadvantages may be partially avoided by using a conventional block code, such as described in "A New 8B10B Block Code for High Speed Data Transmission Over Unshielded Twisted Pair Channels", by Alistair Coles, Hewlett Packard, October 1996. In this instance the code redundancy is approximately 25%, because, instead of 8 information bits, 10 code bits are transmitted. The code has no DC component, on the average, because, as a function of the number of the transmitted ones in comparison to the zeros (running digital sum—RDS) the code word is transmitted either inverted or non-inverted. The maximum number of equal code bit values (maximum run length MRL) is 17. With that, in principle, a connection of a PLL for timing recovery would still be possible, this, however, putting high demands on the stability of the PLL, and the build-up times becoming substantially longer.

A disadvantage of the block codes is that it is not a systematic code, and consequently there is no coding rule as there is, for instance, in the case of a hexadecimal code having a significance assignment of the corresponding code bits corresponding to their position.

This has an effect especially in the implementation of an incrementer or a comparator, because first of all, especially in the case of the incrementer, the entire code word has to be received, the code value has to be ascertained by decoding using a table, and, for the code value increased by 1, the corresponding code word is generated using a table, and which then may first be emitted again, synchronized by at least one flip-flop. For the above-named block code, there comes about, through this, a delay of at least 11 clock pulses; in the case of storing the code tables in a synchronous RAM, there even comes about a delay of at least 13 clock pulses.

Thus, the conventional system does not demonstrate optimal properties in every respect.

This is true especially in regard to the properties that the code used is supposed to be with no DC component and is supposed to include frequent edges because of the required timing recovery, and is supposed to offer the possibility of serial incrementing, in order to generate the network position of a node by the simple incrementing of a special control byte and by forwarding it without great delay. In this context, it is especially desirable to find an electrical design approach which clearly has lower costs, that is, in particular, can be applied without the need of shielding within the scope of the EMC compatibility.

SUMMARY

An example design approach according to the present invention avoids the disadvantages of conventional systems, and, at the same time, offers the required properties, especially since by contrast, in the case of a systematic code, it is already possible, upon reception of the code bits having the lower significance, to have at one's disposal the incremented value of these bits and emit them without having as yet received the entire code word.

In accordance with an example embodiment of the present invention, a method and a device are provided for code generation in an especially serial transmission of data via a communications system having at least two subscribers, and to a corresponding subscriber, at least one first subscriber receiving at least one data word and forwarding the data word or an at least partially changed data word to at least one second subscriber, the data being represented as bits that may assume two different values, that is, in a binary manner. In this context, according to the example embodiment of the present invention, at least two bits of a data word are coded in at least three bits in such a way that always at least two bits of the same value succeed one another, and after receipt of two of the three coded bits it can already be decided, or is decided which first code bit is emitted. Thus, on the one hand the possibility of the serial incrementing may be easily implemented, and on the other hand, this may be achieved without a great delay in time, and specifically clearly less than in the case of the block code. Especially in the case of arbitration, depending on the coding, generally, it may be decided already after one bit, but certainly after two bits, what is to be emitted, if the transmission is using MSB first.

Advantageously, on the one hand, the code generation or the code transmission may now begin at the lowest value bit of a data word, and consequently, incrementing or also decrementing of at least single bits of the data word may be carried out. The code generation or code transmission may also begin at the highest value bit of a data word, and a comparison of at least single bits, especially an arbitration of the data word may be carried out, a compare result being able to be output, or, within the scope of an arbitration, the selection of the data to be transmitted or the prevailing data of the highest priority are able to be ascertained.

In order to limit the expenditure, in an advantageous manner in the example embodiment, in each case at least two bits can be coded in three bits, all the remaining bits of a data word being transferred uncoded. In a further specific embodiment, all the bits of a data word are coded to have in each case two bits coded in three bits, the data word having a bit number that is a multiple of 2.

In one special specific embodiment, one may switch over within the scope of an arbitration between incrementing or decrementing and comparison, and thus between beginning at the lowest value bit of a data word and beginning at the highest value bit of a data word.

It is particularly advantageous if, in addition to a data word, the data word inverse to it is transmitted, particularly at the beginning a group select bit being transmitted for the identification of the type of transmission, that is, inverse or not inverse, corresponding to each data word. Thus, freedom from a DC component may be achieved, so that an electrical design approach (but also an optical transmission) may be implemented without shifting the reference level as a function of the DC level.

The switching over between incrementing or decrementing and the comparison may be made, in this context, especially as a function of the position of the data word (or at least of a bit) in a data frame. Likewise, it is possible that the switchover is made as a function of at least one identifier in a preceding data word or a special data frame having a special identity.

Advantageously, non-data words are provided as supplementation, which do not correspond to any data, but transmit additional information, especially control information, and as such non-data words are clearly recognizable.

It may be especially advantageous to represent the method according to the present invention within the scope of a computer program or a computer product having program code that is stored on a data carrier, the method being executed if the program is run in a computer-assisted communications system, as described above.

BRIEF DESCRIPTION OF THE DRAWINGS

The present invention is explained with reference to the figures.

DETAILED DESCRIPTION OF EXAMPLE EMBODIMENTS

Figure 1:
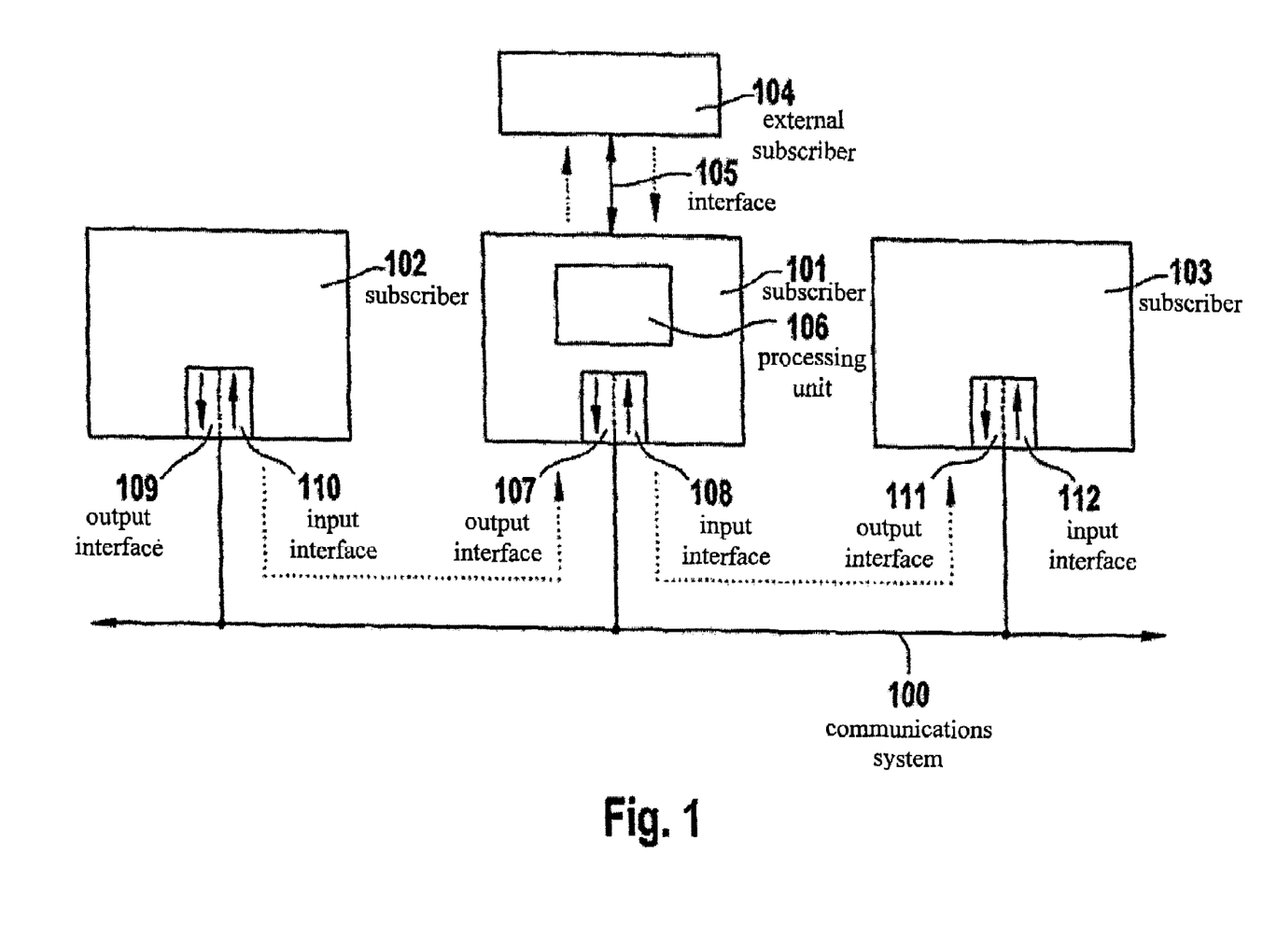
FIG. 1 shows a communications system having subscribers.
Figure 1A:
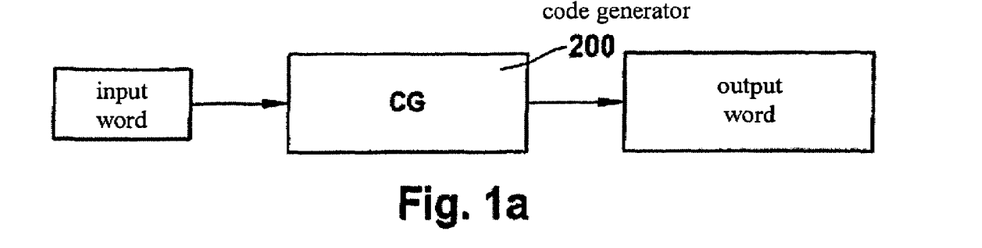
FIG. 1*a* shows a code generator according to an example embodiment of the present invention, having an assignment according to rule 1*b*.

FIG. 1 shows a communications system or bus system 100, having input interfaces 110, 108 and 112, e.g., receivers or receiving modules, and output interfaces 109, 107, 111, e.g., transmitters or sending modules. Using these transmitters and receivers, subscribers 101, 102 and 103 are connected to each other via communications system 100. 106 represents a processing unit which, according to the present invention, carries out the function of code generation and/or decoding and/or incrementing and/or comparison or, more precisely, arbitrating. 104 represents a unit that is external to communications system 100, which is connected unidirectionally or bidirectionally to a subscriber, especially, in this case, to subscriber 101, via interface 105. This external unit 104 substitutes for the connection of additional devices, units or elements via interfaces or bus systems or communications systems to individual subscribers.

During the transmission of the data via serial buses, especially communications system 100, an incrementing or an arbitration, e.g., a comparison takes place corresponding to the dotted transmission arrows during the transmission of the coded data. In the same way, however, it is also possible to input data to a subscriber 101 via an external subscriber 104, and then to forward these data in coded form, for example, in this case, to subscriber 103, again corresponding to the dotted arrows, or even to receive coded data from subscriber 102 to subscriber 101 and then to forward these data to an external subscriber 104 in decoded form. In this case, in particular, however, forwarding of the coded data is to take place on communications system 100, specifically taking into account incrementing or comparison, or, more precisely, arbitrating, from subscriber 102 to subscriber 101 and then to subscriber 103.

In using a bifrequency code for coding, only two clock pulses of delay are required for serial incrementing if, for example, one transmits the lowest value bit of a data word, that is, the LSB (least significant bit) first. In this context, it is necessary to know only which value the currently received code bit value and the previous one have, in order to determine the value to be output, that is, the value to be forwarded, of the respective bit.

According to the present invention, it is now provided to undertake a coding of two information bits using three code bits, in the following manner (rule 1):

| Information Bits | Code Bits | Value Assignment (decimal/hexadecimal) |
|---|---|---|
| 00 | 000 | 0 |
| 01 | 100 | 1 |
| 10 | 110 | 2 |
| 11 | 111 | 3 |

Using a code redundancy of 50%, code words 010 and 101 are avoided, whereby the influence of the high spectral proportions in the code word is reduced. Whereas, from left to right, the values $2^1$ or $2^0$ are assigned to the information bits, the weights of all code bits are $2^0$. In order to distinguish between the single bits in the code, in this case the nomenclature $2^{0(3)}$, $2^{0(2)}$ or $2^{0(1)}$ is used, from left to right. According to the following rules 2, 3 and 4. This makes for a systematic coding rule, which also functions starting from any other code. If, for example, one has a one-hot coding, the four code words 0001, 0010, 0100 and 1000 are also assignable to the values 0, 1, 2 and 3, as in the case of a Gray code 00, 01, 11 and 10.

Figure 2:
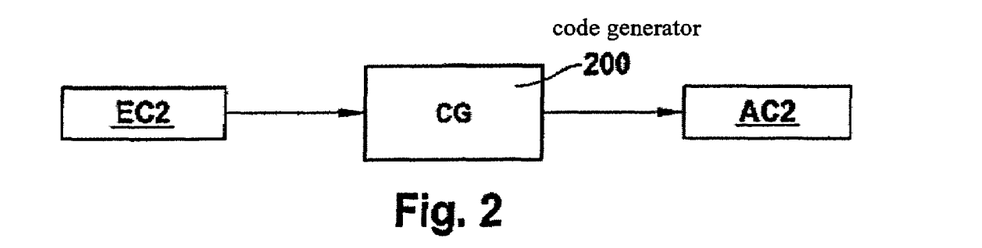
FIGS. 2, 2*a*, 3, 4 and 4*a* show schematically the conversion of an input coded to an output code with the aid of a code generator (FIG. 2), decoder—"direction of arrow reversed", that is, EC2*a* corresponds to AC2 and AC2*a* corresponds to EC2 (FIG. 2*a*), an incrementer (FIG. 3) or a comparator (FIG. 4) as well as an arbitration unit having a comparator and a conversion unit (FIG. 4*a*).
Figure 2A:
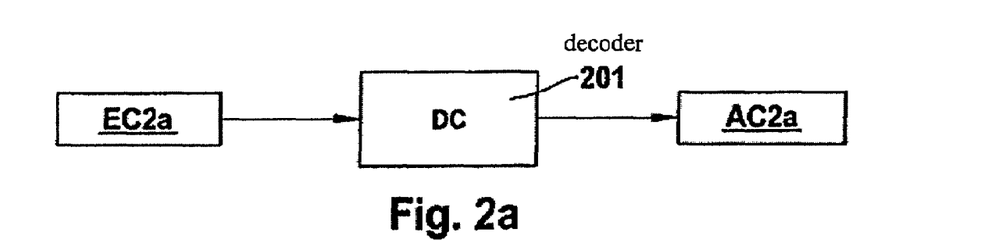
Figure 2B:
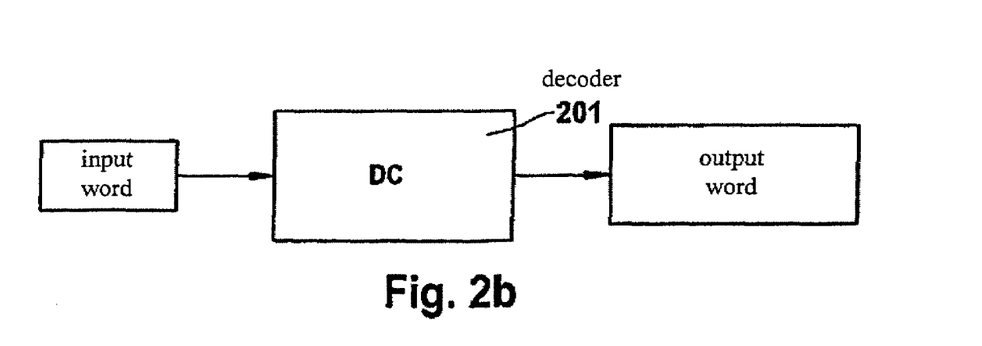
FIG. 2*b* shows schematically the conversion of an input code into an output code with the aid of a code generator that is designed as a decrementer.

From one input code word or input data word EC2 as in FIG. 2, a code generation by code generator 200 CG into an output code word or output data word AC2 is always uniquely possible thereby. In the same way, in FIG. 2a, a decoding is shown of a data word EC2a into a data word AC2b by decoder DC 201. Now, this code according to the present invention is also suitable for carrying out a serial incrementing, as is explained further below. According to rules 2, 3 and 4 (below), these single bits may now be distinguished from left to right according to the nomenclature $2^{0(3)}$, $2^{0(2)}$ or $2^{0(1)}$, the incremented value being given and, correspondingly, overflow OF is created. This generated overflow OF is used for a serial coding as in rule 5, below, or shown in FIG. 5.

| | Rule 2 for generating $2^{0(1)}$ | |
|---|---|---|
| Code Bits | Incremented value of $2^{0(1)}$ and | Overflow (OF) |
| 000 | 0 | 0 |
| 100 | 0 | 0 |
| 110 | 1 | 0 |
| 111 | 0 | 1 |

| | Rule 3 for generating $2^{0(2)}$ | |
|---|---|---|
| Code Bits | Incremented value of $2^{0(2)}$ and | Overflow (OF) |
| 000 | 0 | 0 |
| 100 | 1 | 0 |
| 110 | 1 | 0 |
| 111 | 0 | 1 |

| | Rule 4 for generating $2^{0(3)}$ | |
|---|---|---|
| Code Bits | Incremented value of $2^{0(3)}$ and | Overflow (OF) |
| 000 | 1 | 0 |
| 100 | 1 | 0 |
| 110 | 1 | 0 |
| 111 | 0 | 1 |

Figure 3:
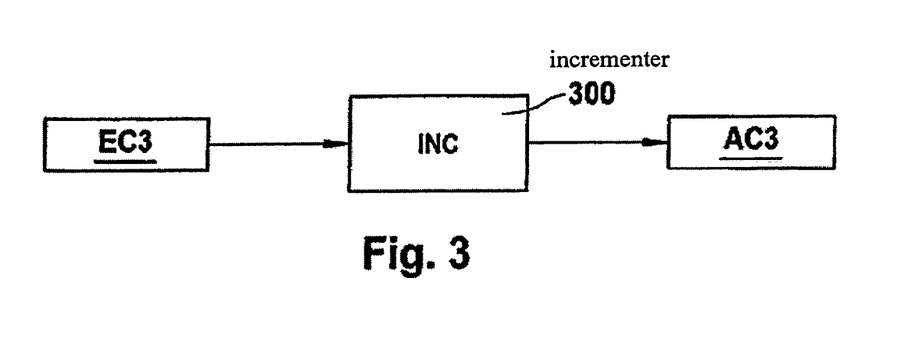

In that manner, from an input bit sequence or an input data word or an input code word EC3, according to FIG. 3, an output sequence AC3 is generated by incrementer INC 300. This is also possible, according to FIG. 4, within the scope of a comparison by comparator COMP 400, especially in the case of an arbitration from the input code sequence or input data word EC4 into output data word AC4 according to FIG. 4.

The change of incrementation to arbitration takes place, in this context, in the directional switchover, for the purpose that either the LSB, or least significant bit, the least valued bit, is evaluated first, which is required for incrementation, or, for a change in the direction of transmission, the most significant bit, MSB, that is the highest valued bit is evaluated first, and consequently leads to the comparison, especially the arbitration. This is explained illustratively below. Thus the code generator in FIG. 2, CG 200, carries out an assignment according to rule 1, the incrementer in FIG. 3 carries out an assignment according to rules 2, 3 and 4, in FIG. 2, generated output code AC2, according to the present invention, being generated from input code EC2, and in FIG. 3, incremented output code AC3, according to the present invention, being generated from already coded input code EC3.

The serial incrementation will now be explained in greater detail, in light of FIG. 5, using respective values c or u, x, y, z, w according to rule 5.

| | | Rule 5 | | |
|---|---|---|---|---|
| c or u | y | x | z | w |
| 0 | 0 | 0 | 0 | 0 |
| 0 | 1 | 0 | 0 | 0 |
| 0 | 1 | 1 | 1 | 0 |
| 0 | 0 | 1 | 1 | 0 |
| 1 | 0 | 0 | 0 | 1 |
| 1 | 1 | 0 | 1 | 0 |
| 1 | 1 | 1 | 0 | 1 |
| 1 | 0 | 1 | 0 | 1 |

Figure 5:
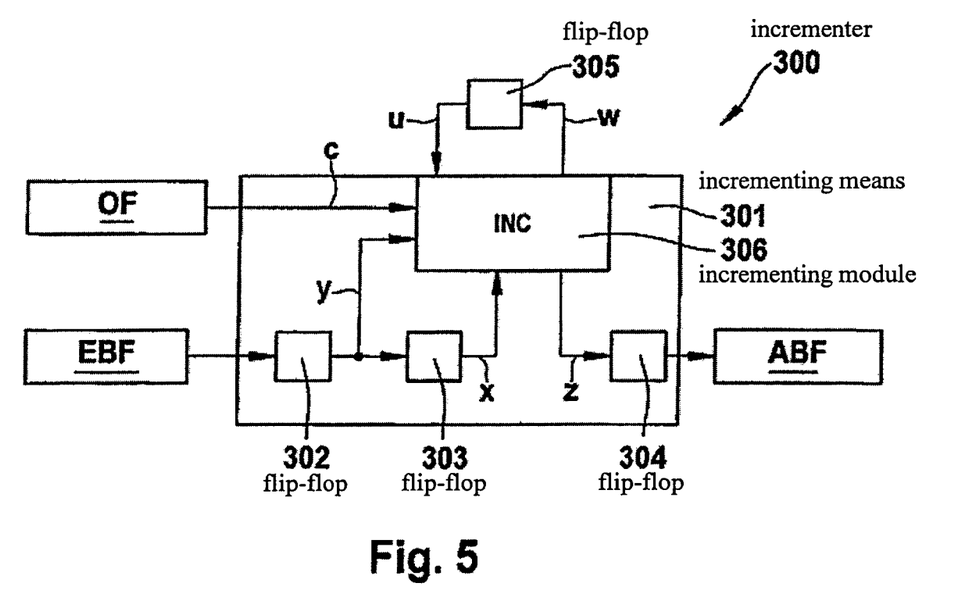
FIG. 5 shows serial incrementer according to an example embodiment of the present invention.

FIG. 5 shows incrementer 300 as in FIG. 3 having an incrementing module 306 INC, an incrementing means 301 and a feedback branch which includes a flip-flop 305. Additional flip-flops are shown as 302, 303 and 304. These flip-flops may be implemented by any clock-pulse controlled memory elements. In this incrementer 300, that is incrementing means 301 having feedback, on the one hand, an input bit sequence EBF corresponding to a data word or data frame having several, at least two data words, as shown, is brought in applied, at the same time overflow OF, as shown, is taken into consideration and is converted to an incremented output bit sequence ABF or an output data word even an output data frame. For the serial incrementing of the code, for generating code bit x, information about subsequent code bit y is always required, if the transmission begins with the least significant bit, LSB, that is, with the lowest value bit of the bit sequence. Therefore the code has to be forwarded delayed by at least one clock pulse. For the synchronization of the data bit sequence that is received and that is to be transmitted, in an advantageous way, in each case a flip-flop, that is 302 and 304, is inserted at the input and the output. The incrementation which takes place for the input overflow OF is c, for the intermediate overflow u, for the input bits x and y according to rule 5, for the output bit z, as well as for the generated intermediate overflow w. With that, it is now possible to compose even larger code words while possibly using rule 1 several times for, in each case, parts of the code word, or directly to insert even parts without further coding, specifically the information bits in rule 1, an is explained in more detail in rule 6.

Rule 6

| Information Bits | Code Bits | Value Assignment (hexadecimal) |
|---|---|---|
| 00 00 | 000 000 | 0 |
| 00 01 | 000 100 | 1 |
| 00 10 | 000 110 | 2 |
| 00 11 | 000 111 | 3 |
| 01 00 | 100 000 | 4 |
| 01 01 | 100 100 | 5 |
| 01 10 | 100 110 | 6 |
| 01 11 | 100 111 | 7 |
| 10 00 | 110 000 | 8 |
| 10 01 | 110 100 | 9 |
| 10 10 | 110 110 | A |
| 10 11 | 110 111 | B |
| 11 00 | 111 000 | C |
| 11 01 | 111 100 | D |
| 11 10 | 111 110 | E |
| 11 11 | 111 111 | F |

Compared to the incrementation of a block code (which, as was shown before, cannot be done serially) there comes about, using the system as in FIG. 5, always only a delay by 3 clock pulses even in the case of rule 6, since the two code parts are processed one after the other. The code of rule 6 processes a half byte, that is, four information bits (=1 nibble), as the information word. The code redundancy amounts to 50%. It is, however, a disadvantage in this case that, by alignment of the values 0 or F, larger blocks may be created without level change and the code has no DC component.

To remove this disadvantage, a code is first selected according to rule 7, which has only 25% code redundancy, when a part of the original code is taken over unchanged.

Rule 7

| Information Bits | Code Bits | Value Assignment (hexadecimal) |
|---|---|---|
| 00 00 | 000 00 | 0 |
| 00 01 | 000 01 | 1 |
| 00 10 | 000 10 | 2 |
| 00 11 | 000 11 | 3 |
| 01 00 | 100 00 | 4 |
| 01 01 | 100 01 | 5 |
| 01 10 | 100 10 | 6 |
| 01 11 | 100 11 | 7 |
| 10 00 | 110 00 | 8 |
| 10 01 | 110 01 | 9 |
| 10 10 | 110 10 | A |
| 10 11 | 110 11 | B |
| 11 00 | 111 00 | C |
| 11 01 | 111 01 | D |
| 11 10 | 111 10 | E |
| 11 11 | 111 11 | F |

In order to form the code according to rule 7 to have no DC component, another inverting bit, which first of all has a value of 0, is fitted in below the least significant bit, that is, the lowest value bit. Then, the inversion of the entire code word, that is, including the inverting bit, does not lead to a change in the value. Thus, there are two code words having the same value, which begin with different bit values. In the case of a sequence of zeros, one may then alternatively transmit the code word 000000 and 111111. Doing this yields a complete compensation of the DC components, that is, a different number of ones and zeros according respectively to two code words. Furthermore, at each beginning of a code word there is a change of level which may be used for a timing recovery using PLL. From this, there now comes about rule 8, as shown below.

Rule 8

| Information Bits | Code Bits | Inversion Bits | Value Assignment (hexadecimal) |
|---|---|---|---|
| 00 00 | 000 00 | 0 | 0 |
| 00 01 | 000 01 | 0 | 1 |
| 00 10 | 000 10 | 0 | 2 |
| 00 11 | 000 11 | 0 | 3 |
| 01 00 | 100 00 | 0 | 4 |
| 01 01 | 100 01 | 0 | 5 |
| 01 10 | 100 10 | 0 | 6 |
| 01 11 | 100 11 | 0 | 7 |
| 10 00 | 110 00 | 0 | 8 |
| 10 01 | 110 01 | 0 | 9 |
| 10 10 | 110 10 | 0 | A |
| 10 11 | 110 11 | 0 | B |
| 11 00 | 111 00 | 0 | C |
| 11 01 | 111 01 | 0 | D |
| 11 10 | 111 10 | 0 | E |
| 11 11 | 111 11 | 0 | F |

Rule 9 below now shows all data words with their two possible variants.

Rule 9
(for transmitting using LSB first):

| Information Bits | Code Word 1 | Code Word 2 | Value Assignment (hexadecimal) |
|---|---|---|---|
| 00 00 | 000 000 | 111 111 | 0 |
| 00 01 | 000 010 | 111 101 | 1 |
| 00 10 | 000 100 | 111 011 | 2 |
| 00 11 | 000 110 | 111 001 | 3 |
| 01 00 | 100 000 | 011 111 | 4 |
| 01 01 | 100 010 | 011 101 | 5 |
| 01 10 | 100 100 | 011 011 | 6 |
| 01 11 | 100 110 | 011 001 | 7 |
| 10 00 | 110 000 | 001 111 | 8 |
| 10 01 | 110 010 | 001 101 | 9 |
| 10 10 | 110 100 | 001 011 | A |
| 10 11 | 110 110 | 001 001 | B |
| 11 00 | 111 000 | 000 111 | C |
| 11 01 | 111 010 | 000 101 | D |
| 11 10 | 111 100 | 000 011 | E |
| 11 11 | 111 110 | 000 001 | F |

Rule 9 represents a preferred exemplary embodiment for transmitting the code with the LSB first. If the number of ones is constantly added during the transmission, and the number of zeros subtracted from it, one obtains the RDS, the running digital sum, which gives information as to whether more ones or zeros are being transmitted. Using code words that include a different number of ones and zeros, one may influence the RDS by the selection between code word 1 and code word 2. Under favorable circumstances one tries to arrive at the value RDS=0, and thereby to form the code with no DC component, on average. However, in this context, slight deviations from this rule are also possible, if one either wishes to force a level change between the code words, e.g., because of the timing recovery, that is, the PLL, or avoid it because of the frequency spectrum.

If the input code word increments in the incrementer according to rule 9, that is, from the point of view of the value, this may lead to a change in the RDS value according to the incremented data value compared to the original value. In this context, for the incremented data word to be transmitted, there is not the possibility of selecting the inverse code word, because the inverting bit has to be sent before the entire code word has been received. A correction may be made in this situation by subsequent non-data code words which, for example, may characterize the beginning of a data frame, if a selection from several values having different RDS values is admissible at an equal meaning with respect to the frame characterization.

The incrementing according to rules 2, 3, 4 and 5 is only described for code words 1 according to rule 9. For code words 2, all zeros (0) are to be replaced by ones (1), and, in reverse, the ones by zeros. Then the same rules apply.

The code described in the preceding paragraph according to rule 9 is particularly suitable for serial incrementing (in conjunction with LSB first) or for arbitration (in conjunction with MSB first). This code is less suitable for decrementing, because there then exists no rule corresponding to rule 5 for this code which, independently of the position in the code, determines the new code bit (to be transmitted) from input bits x and y and from overflow bits c and u. Therefore, especially for decrementing, the following generating rule 1.b is used instead of rule 1:

| Date | Coding rule 1.b | Value (hex) |
|---|---|---|
| 00 | 000 | 0 |
| 01 | 001 | 1 |
| 10 | 011 | 2 |
| 11 | 111 | 3 |

The following rules 2b,3b or 4b are obtained for the decrementing on the basis of code 1.b instead of rules 2, 3 and 4 for the incrementing on the basis of rule 1:

(Rule 2b):
For generating $2^{0'}$

| Code Bits | Decremented value of $2^{0'}$ and | Overflow |
|---|---|---|
| 000 | 1 | 1 |
| 001 | 0 | 0 |
| 011 | 1 | 1 |
| 111 | 1 | 1 |

(Rule 3b):
For generating $2^{0''}$

| Code Bits | Decremented value of $2^{0''}$ and | Overflow |
|---|---|---|
| 000 | 1 | 1 |
| 001 | 0 | 0 |
| 011 | 0 | 0 |
| 111 | 1 | 1 |

(Rule 4b):
For generating $2^{0'''}$

| Code Bits | Decremented value of $2^{0'''}$ and | Overflow |
|---|---|---|
| 000 | 1 | 1 |
| 001 | 0 | 0 |
| 011 | 0 | 0 |
| 111 | 0 | 0 |

The generated overflow is used in the case of serial coding (see rule 5b). The advantage in this code is that the output value and the overflow are identical in the case of decrementing, and otherwise the overflow is 0.

Figure 3A:
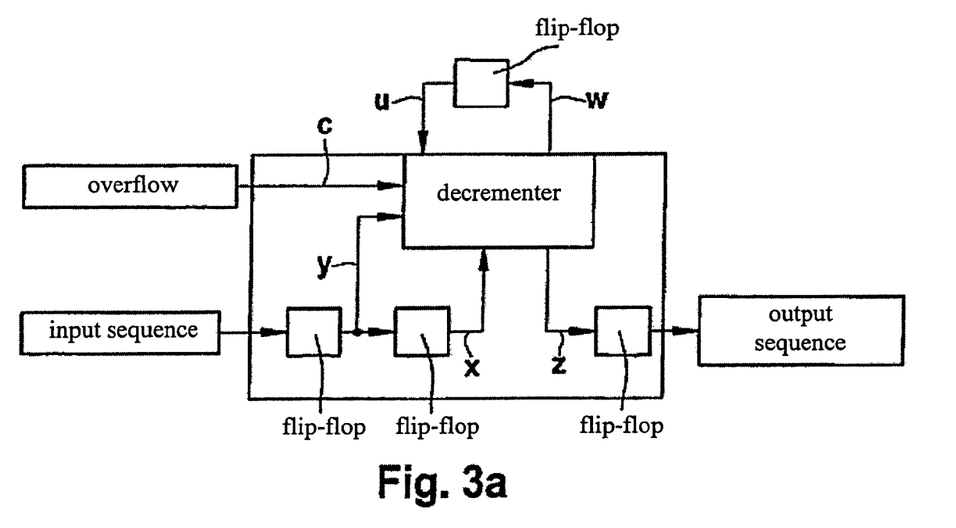
FIG. 3*a* also shows a conversion using decrementers, here especially according to rule 5*b*.

For the serial decrementing of the code, in order to generate code bit x, information on the directly following code bit y is required (if the transmission is begun with the LSB). Therefore, as in the case of serial incrementing, the code has to be forwarded delayed by at least one clock pulse. For the synchronization of the data bit sequence that is received and that is to be transmitted, in an advantageous way, in each case a flip-flop is inserted at the input and the output. Decrementing takes place for input overflow c, intermediate overflow u, input bits x and y according to rule 5b for output bit z as well as for generated intermediate overflow w (FIG. 3a):

| Rule 5b | | |
|---|---|---|
| c or u | y x | z w |
| 0 | 0 0 | 0 0 |
| 0 | 0 1 | 1 0 |
| 0 | 1 0 | 0 0 |
| 0 | 1 1 | 1 0 |
| 1 | 0 0 | 1 1 |
| 1 | 0 1 | 0 0 |
| 1 | 1 0 | 1 1 |
| 1 | 1 1 | 1 1 |

However, the code according to the present invention, both according to rule 1 and rule 1b, may also be used for arbitration purposes, that is, for comparator purposes. Thus the described code, especially according to rule 9, may be used on the basis of rule 1 also for arbitration purposes having variable priorities. For this, it is necessary to begin with the transmission of the highest value bit, that is, the most significant bit, whereas for incrementing and also for decrementing, as was mentioned before, one begins with the least significant bit, that is, the LSB, the lowest valued bit. However, the inverting bit is transmitted first even then (rule 10).

Rule 10 for transmitting with MSB first, according to coding rule 1:

| Information Bits | Code Word 1 | Code Word 2 | Value Assignment (hexadecimal) |
|---|---|---|---|
| 00 00 | 0 000 00 | 1 111 11 | 0 |
| 00 01 | 0 000 01 | 1 111 10 | 1 |
| 00 10 | 0 000 10 | 1 111 01 | 2 |
| 00 11 | 0 000 11 | 1 111 00 | 3 |
| 01 00 | 0 100 00 | 1 011 11 | 4 |
| 01 01 | 0 100 01 | 1 011 10 | 5 |
| 01 10 | 0 100 10 | 1 011 01 | 6 |
| 01 11 | 0 100 11 | 1 011 00 | 7 |
| 10 00 | 0 110 00 | 1 001 11 | 8 |
| 10 01 | 0 110 01 | 1 001 10 | 9 |
| 10 10 | 0 110 10 | 1 001 01 | A |
| 10 11 | 0 110 11 | 1 001 00 | B |
| 11 00 | 0 111 00 | 1 000 11 | C |
| 11 01 | 0 111 01 | 1 000 10 | D |
| 11 10 | 0 111 10 | 1 000 01 | E |
| 11 11 | 0 111 11 | 1 000 00 | F |

Figure 6:
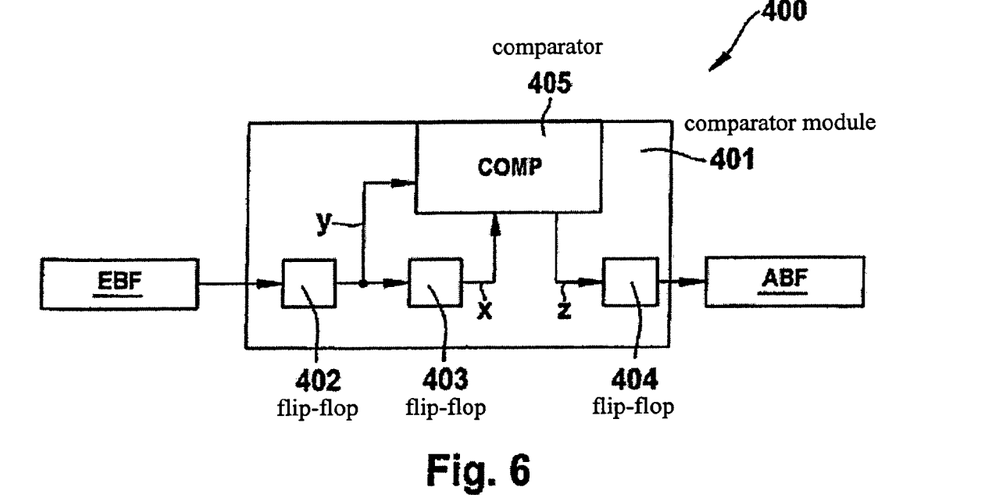
FIG. 6 shows a serial comparator.
Figure 6A:
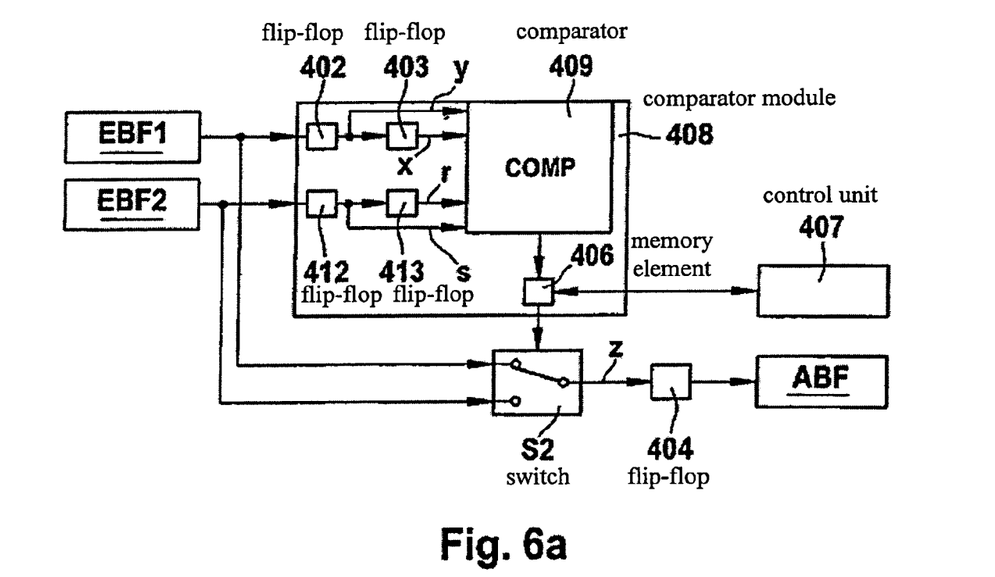

A circuit for this comparison or arbitration is shown with comparator 400 according to FIG. 6 and FIG. 6a. It shows a comparator module 401 or 408 having the actual comparator 405 or 409 COMP, only in this case respectively two flip-flops 402, 403 or 412, 413 being required for the delay and synchronization of the two input bit sequences that are to be compared, which here too may be represented by any clock pulse-controlled storage elements. For the arbitration of the code, to make the decision on the transmission of code bit x or r in FIG. 6 or FIG. 6a in the general case, the information on the following code bit y or s is again required. In this case, this is true if the transmission is begun with the MSB, that is, the most significant bit. Here too, therefore, the code is forwarded delayed by at least one clock pulse. For the synchronization of the data bit sequence that is received and that is to be transmitted, in an advantageous way, in each case a flip-flop 402 and 412, is inserted at the input and the output. Following the rule according to the present invention, from the input bits x and y or r and s, output bit z and consequently the selection of the input bit sequence EBF or EBF 1 and its conversion into output bit sequence ABF are performed within the scope of the arbitration. In this context, the comparator decision remains stored, in FIG. 6a, in memory element 406, until the decision is reset using a control unit 407. The comparator decision, once taken, may also be used in the following course of the data transmission, in order purposefully to undertake an additional switchover between the two input bit sequences. To do this, the currently taken comparator decision is transmitted to control unit 407, and is stored there. With the aid of this information, memory element 406 may be set and reset as desired by 407. In FIG. 6a there is furthermore provided a switch or switchover unit S2, which makes possible a change between input bit sequences EBF1 and EBF2 for an additional sequence, as described for FIGS. 6 and 6a.

Figure 4:
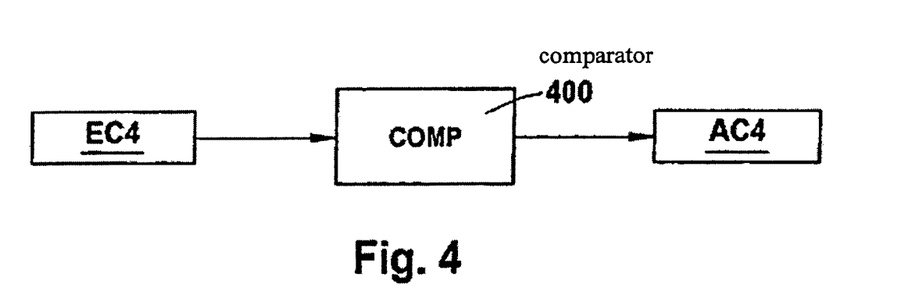
Figure 4A:
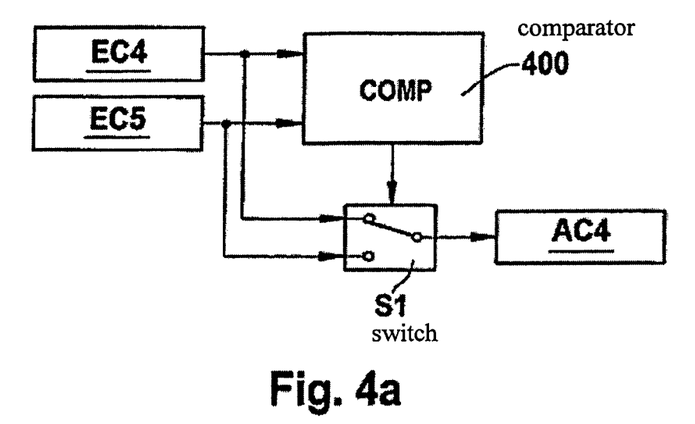

FIG. 4a shows this change, this circuit using switch or switchover unit S1 for two input data words EC4 and EC5 for a comparator 401 according to FIG. 4 and an output data word AC4.

Incrementing (or decrementing) and arbitrating cannot occur simultaneously in a data word. However, within the scope of circumstances in which there is to be arbitration or incrementation (decrementation), a change in the sequence of transmission or transmitter may be undertaken. As a function of the transmitting direction there now comes about for rule 9 in the exemplary embodiment, specifically LSB first, and therewith the incrementing variant or MSB first with rule 10, and therewith the arbitrating variant. In this context, the first two bits of the piece of data are converted according to the two-bit coding into three-bit coding, and the second two bits, that is, bit 3 and bit 4 of the piece of data are taken over uncoded. At the same time, the inversion bit, that is, the bit that indicates whether the inverted or the non-inverted variant is involved, is added according to rule 9 as least significant bit in code word 1 and code word 2, that is, all the way over to the right. Now, with regard to the MSB side, the situation is similar, so that the first two bits of the piece of data are coded, in each case in the middle block of three, into the triple bits, and the two last bits of code words 1 or 2 are simply taken over as bit 3 and bit 4 of the piece of data. However, in this case, the bit indicating the inversion is added as highest value bit, MSB, in each case at the left at code word 1 and code word 2 of the MSB variant.

As an example for illustration, in this case, again a bus is suitable in which, as in the MOST bus, the data are transmitted within the framework of fixed length, depending on the frame position, a change in the transmission sequence or the transmission direction being able to be undertaken. If, for example, the transmitting of a control frame is to be decided after a prioritization, in that the received priority is compared with its own priority, it is advantageous to transmit the MSB first. With that, as shown in FIG. 6a, one may perform a direct switchover. If, by contrast, the network position is to be determined and at the same time (without intermediate storing) is to be forwarded to the following node, the corresponding control byte has to be sent with the LSB first, in order to be able to increment serially (according to FIG. 5). Since the control frame information is always transmitted at a fixed place in the data frame, that is to the frame, at MOST always the $61^{st}$ and $62^{nd}$ byte, in this case, advantageously, the transmission sequence is changed as a function of the word counter or byte or bit counter within a data frame, or counter.

In this context, one should note, and not only for the MOST case, that according to the present invention, the inversion bit is always transmitted first, that is, independently of whether starting with the LSB or the MSB. With reference to above-named rule 1, which represents a preferable systematic design approach variant for the coding according to the present invention of two information bits into three code bits with regard to EMC properties, the following variants for rule 1 are also possible.

| Piece of Data | Coding rule 1.b | Coding rule 1.c | Value (hex) |
|---|---|---|---|
| 00 | 000 | 000 | 0 |
| 01 | 001 | 010 | 1 |
| 10 | 011 | 110 | 2 |
| 11 | 111 | 111 | 3 |

| Piece of Data | Coding rule 1.d | Coding rule 1.e | Value (hex) |
|---|---|---|---|
| 00 | 000 | 000 | 0 |
| 01 | 100 | 011 | 1 |
| 10 | 110 | 110 | 2 |
| 11 | 011 | 111 | 3 |

In this context, the coding rule according to 1b has the same advantages for the case of decrementing compared to rule 1 for incrementing. Here, too, there is present a systematic code in which each code bit may be assigned a value $2^0$. However, let us first of all explain in more detail the case of incrementing.

Figure 7:
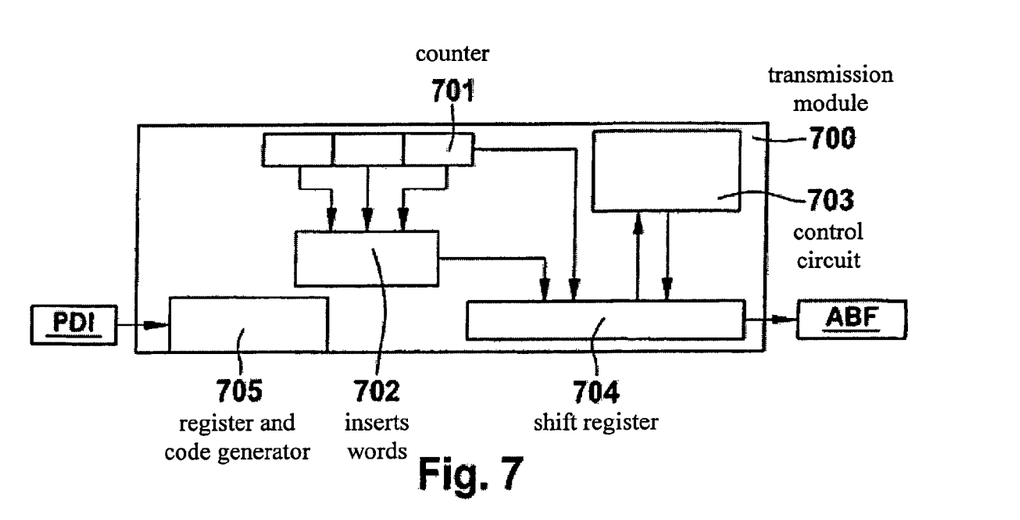
FIG. 7 shows a serial transmitter as interface of, or to the communications system(s).
Figure 8:
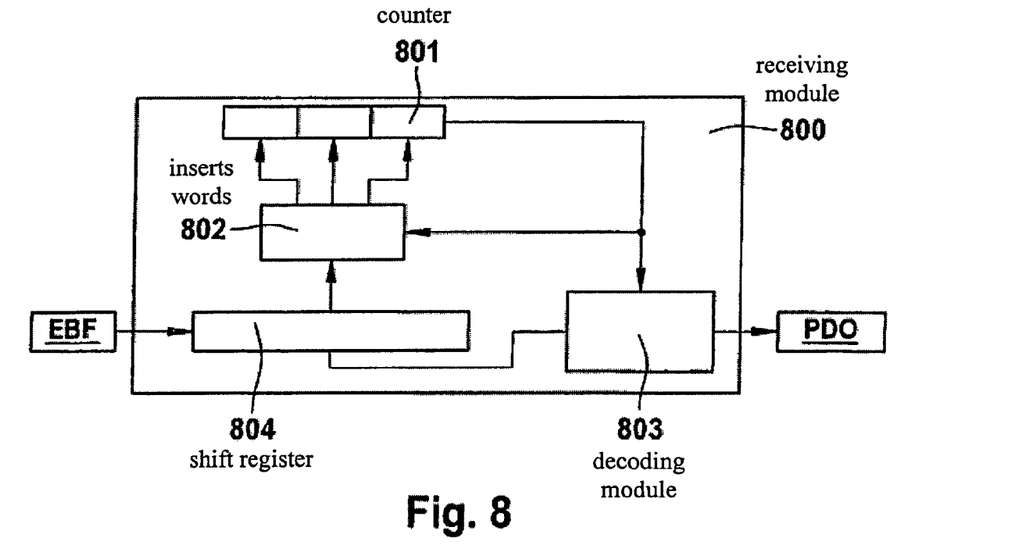
FIG. 8 shows a corresponding serial receiver.

Corresponding to the preferred embodiment variant as in rule 1, or rather rules 9 and 10 developed from it, special transmission modules and receiving modules according to FIG. 7 and FIG. 8, that is, transmitters and receivers, may now be shown. FIG. 7 shows a serial transmitter, in which parallel data input, PDI, that is, for example, n bit parallel is input into a register and code generator 705. In this example, n is preferably 4. Using a shift register 704, which is able to pack k bits, where k is preferably 6, an output bit sequence ABF may then be output to communications system 100. In this context, transmission module 700 includes optional elements 701 to 703, which will be explained. During the switchover between LSB and MSB first, that is, between incrementation and arbitration as a function of a word counter or counter if, for example, the transmission sequence is changed, such a counter 701 is required. At the same time, a control circuit 703 is required which particularly controls the inversion control, that is, the specification of the inverting bit corresponding to LSB and MSB according to rule 9 or 10. At the same time, monitoring of the RDS value may take place, or rather specification, by this circuit 703. Block 702 is used for inserting non-data words, which will be explained later. Similarly, in block 703 the function of the D control may be implemented, which will be explained in greater detail below.

Corresponding to transmission module 700, 800 in FIG. 8 shows a receiving module or serial receiver. In this exemplary embodiment, an input bit sequence EBF is supplied to a shift register 804 having k bits, here too preferably k=6. Block 803 represents the corresponding decoding module, especially having a register. According to the present invention, in order to emit a parallel bit sequence, that is, PDO of, for instance, n bits, with n=4, use is again made of the switchover, and, for example, the transmitting sequence is changed as a function of the word counter, and counter 801 is optionally installed. Block 802 is again used to detect the non-data words, that is, for decoding them, whereby a partial setting of the counter may take place, as will be explained later. This means that transmitter and receiver according to FIG. 7 and FIG. 8, according to the present invention, are able to undertake the complete coding and decoding.

The non-data words, described above in connection with elements 702 and 802 is now explained in greater detail. The code space for 6 code bits permits $2^6$=64 different possibilities, of which, according to rule 9 only 32 data code words are assigned. For some application cases it is meaningful to agree to have some non-data code words or non-data words having additional information, especially having control data, be used for control purposes. Using this, one may, for example, indicate the beginning of a transmission or cause other control functions, such as transition into another operating mode, as well as initiate the transmission of special sequence information. These non-data code words may be a block preamble or a data frame preamble, that is, a frame preamble, for instance. The frame preamble indicates only the beginning of a frame. If several frame preambles are allowed, then, by the selection of the variant, various additional data may be transmitted. Such additional information may be the RDS value under which the following coding was undertaken. Examples of this are provided in Table 2 below.

TABLE 2

| Control Sequence | Code Word 1 | Code Word 2 |
|---|---|---|
| Block Preamble | 101 010 | 010 101 |
| Frame Preamble (rds before code word was 0) | 101 110 | 010 001 |
| Frame Preamble (rds before code word was −2/+2 | 011 110 | 100 001 |
| Frame Preamble (rds before code word was +4/−4) | 011 000 | 100 111 |
| Frame Preamble (rds before code word was +6/−6) | 101 000 | 010 111 |
| Frame Preamble (rds before code word was +8/−8) | 010 010 | 101 101 |

The bit sequence 010101 or, inverted, 101010, plays a special role in the case of the non-data code words. This bit sequence is used for synchronization, and should not be created unintentionally, even by the combination of two data words one after the other. Without an additional condition, the sequence according to rule 9 is created, for example, by the connection of data words D (code word 1) after 4, 5, 6 or 7 (from code word 1): 111010 100xx0 beginning at a transmission of LSB, a change of level between these two data words being provided by the RDS rule. The generation of this bit pattern by a combination of data code words is avoided if, while ignoring the RDS rule, it is always ensured in the transmission of a D that no change in level takes place. In the above example, according to rule 9, one obtains from this the bit sequence 000101 100xx0, and the selected bit sequence cannot be created. Under certain circumstances, this may lead to an increase in DC proportion, for a short period. However, it is impossible that the multiple successions of the transmissions of D leads to a steady increase of RDS, because then, always exactly between code word 1 and code word 2, rule 9 is appropriately changed. If, in addition, one takes care that, in the case of a code word following all the code words subsequent to the value D, having a balanced number of zeros and ones (7, 9, A, C and non-data code words) a level change always takes place (as long as an unbalanced code word does not interrupt this rule), then the RDS is not summed up even in case a data value D is transmitted again, since in that case the other code word may be usable by D, and is even used of necessity according to the above rule. A special control unit in the transmitter controls the emission of data word D, which may be implemented in FIG. 7, in block 703. An additional rule is that when RDS=0, the RDS value is increased, so that RDS does not negatively tend to zero, and this gives it single-valuedness.

Under these boundary conditions, the transmission of the special code word 010101 and its inversion permits the triggering of special control signals in the receiver, which lead to a selected system state. That may, for instance, be the setting of a counter in the receiver, such as by block 802 in counter 801, in FIG. 8. If non-data code words or non-data words are permitted only at regular points in time, since, for example, they mark the beginning of a data frame having constant length, it also makes sense to permit all other non-data words only at a multiple or a fraction of these points in time. Then these code words cannot be mistaken for data words or, in the case of patterns that are formed from two successive data words and that agree with the bit sequence of the non-data code word, they cannot be mistaken for this special control signal. Using this, it is also possible in a limited way to implement error detection. Besides the code variants shown that have preferred variants according to rules 9 or 10, additional components or compositions of rule 1, that is a multiple use of this rule, and direct binary coding is also possible in several ways. The code of the preferred exemplary embodiments avoids the one-sidedly dominant spectrum of a Biphase Mark Coding. It is without DC component on average, and has a maximum run length typically of 13, if retroactive data changes by incrementing are not taken into consideration, and if extreme RDS values up to +6 and −5 are assumed. In exceptional cases this value may become still greater if, for instance, the above-mentioned RDS limits are exceeded for a short period by the transmission of D values or by incrementing. However, these data changes may be compensated for again by subsequent non-data code words. Preferably, non-data words are, for instance, 101010, 001110, 001100, 011110, 011100, according to the table, as well as the inverse values of these, but, in principle, all other non-data words may also be used.

The rules for avoiding the bit sequence 101010 by assembling coded data words according to the exemplary embodiment of rule 9 may be appropriately adapted in response to a switchover of incrementing and arbitrating:

If a change is made from LSB first to MSB first, there exists no rule with regard to inverting besides reducing the RDS value in the absolute quantity.

Between two MSB first values, a level change (instead of "D") to hexadecimal value "A" has to be avoided.

For all balanced codes after an "A" there is no rule in this case, since "A" itself is balanced (no RDS value change with A, whereby no rule for indirectly successive "A"'s is required.

For a transfer from MSB first to LSB first a level change should generally be prevented if the last 3 bits were alternating (after 2, 6, A, D).

For a following "D", the same conditions apply as otherwise, that is, no level change.

For the coding of a data word made up of more than 2 bits, the decision may further be made as to whether all bit pairs are transferred according to rule 1 or 1b coded or which bit pairs are transferred uncoded. In rule 9 it was the 2 LSB's of a 4 bit data word which were to be coded according to rule 1, while the 2 MSB's were transferred directly. The opposite way is possible in exactly the same manner according to rule 9a, in which the LSB's are transferred directly and the MSB's are coded according to rule 1:

| Rule 9a: (preferable exemplary embodiment at original coding according to rule 1 and exchange [transposition] of the sequence of the coded data bits) | | | | | |
|---|---|---|---|---|---|
| LSB first | | | | MSB first | |
| Information Bits | Code Word 1 | Code Word 2 | Value | Assignment | (hexadecimal) |
| 00 00 | 00 000 0 | 11 111 1 | 0 | 0 00 000 | 1 11 111 |
| 01 00 | 00 100 0 | 11 011 1 | 1 | 0 00 100 | 1 11 011 |
| 10 00 | 00 110 0 | 11 001 1 | 2 | 0 00 110 | 1 11 001 |
| 11 00 | 00 111 0 | 11 000 1 | 3 | 0 00 111 | 1 11 000 |
| 00 01 | 01 000 0 | 10 111 1 | 4 | 0 01 000 | 1 10 111 |
| 01 01 | 01 100 0 | 10 011 1 | 5 | 0 01 100 | 1 10 011 |
| 10 01 | 01 110 0 | 10 001 1 | 6 | 0 01 110 | 1 10 001 |
| 11 01 | 01 111 0 | 10 000 1 | 7 | 0 01 111 | 1 10 000 |
| 00 10 | 10 000 0 | 01 111 1 | 8 | 0 10 000 | 1 01 111 |
| 01 10 | 10 100 0 | 01 011 1 | 9 | 0 10 100 | 1 01 011 |
| 10 10 | 10 110 0 | 01 001 1 | A | 0 10 110 | 1 01 001 |
| 11 10 | 10 111 0 | 01 000 1 | B | 0 10 111 | 1 01 000 |
| 00 11 | 11 000 0 | 00 111 1 | C | 0 11 000 | 1 00 111 |
| 01 11 | 11 100 0 | 00 011 1 | D) | 0 11 100 | 1 00 011 |
| 10 11 | 11 110 0 | 00 001 1 | E | 0 11 110 | 1 00 001 |
| 11 11 | 11 111 0 | 11 000 1 | F | 0 11 111 | 1 00 000 |
| ←------ ←------ direction of transmission ------→ ------→ | | | | | |

In the same way, especially in the selection of decrementing possibilities, additional coding rules are possible (rules 9b and 9c):

| Rule 9b (with exchange of sequence of the uncoded data bits and coding according to rule 1.b) | | | | | |
|---|---|---|---|---|---|
| LSB first | | | | MSB first | |
| Information Bits | Code Word 1 | Code Word 2 | Value | Assignment | (hexadecimal) |
| 00 00 | 00 000 0 | 11 111 1 | 0 | 0 00 000 | 1 11 111 |
| 01 00 | 00 001 0 | 11 110 1 | 1 | 0 00 001 | 1 11 110 |
| 10 00 | 00 011 0 | 11 100 1 | 2 | 0 00 011 | 1 11 100 |
| 11 00 | 00 111 0 | 11 000 1 | 3 | 0 00 111 | 1 11 000 |
| 00 01 | 01 000 0 | 10 111 1 | 4 | 0 01 000 | 1 10 111 |
| 01 01 | 01 001 0 | 10 110 1 | 5 | 0 01 001 | 1 10 110 |
| 10 01 | 01 011 0 | 10 100 1 | 6 | 0 01 011 | 1 10 100 |
| 11 01 | 01 111 0 | 10 000 1 | 7 | 0 01 111 | 1 10 000 |
| 00 10 | 10 000 0 | 01 111 1 | 8 | 0 10 000 | 1 01 111 |
| 01 10 | 10 001 0 | 01 110 1 | 9 | 0 10 001 | 1 01 110 |
| 10 10 | 10 011 0 | 01 100 1 | A | 0 10 011 | 1 01 100 |
| 11 10 | 10 111 0 | 01 000 1 | B | 0 10 111 | 1 01 000 |
| 00 11 | 11 000 0 | 00 111 1 | C | 0 11 000 | 1 00 111 |
| 01 11 | 11 001 0 | 00 110 1 | D) | 0 11 001 | 1 00 110 |
| 10 11 | 11 011 0 | 00 100 1 | E | 0 11 011 | 1 00 100 |
| 11 11 | 11 111 0 | 11 000 1 | F | 0 11 111 | 1 00 000 |
| ←------ ←------ direction of transmission ------→ ------→ | | | | | |

Rule 9c: (without exchange of the sequence of the uncoded data bits and coding according to rule 1b)

| Piece of Data | LSB first | | Value (hexadecimal) | MSB first | |
|---|---|---|---|---|---|
| | Code Word 1 | Code Word 2 | | Code Word 1 | Code Word 2 |
| 00 00 | 000 000 | 111 111 | 0 | 0 000 00 | 1 111 11 |
| 00 01 | 000 010 | 111 101 | 1 | 0 000 01 | 1 111 10 |
| 00 10 | 000 100 | 111 011 | 2 | 0 000 10 | 1 111 01 |
| 00 11 | 000 110 | 111 001 | 3 | 0 000 11 | 1 111 00 |
| 01 00 | 001 000 | 110 111 | 4 | 0 001 00 | 1 110 11 |
| 01 01 | 001 010 | 110 101 | 5 | 0 001 01 | 1 110 10 |
| 01 10 | 001 100 | 110 011 | 6 | 0 001 10 | 1 110 01 |
| 01 11 | 001 110 | 110 001 | 7 | 0 001 11 | 1 110 00 |
| 10 00 | 011 000 | 100 111 | 8 | 0 011 00 | 1 100 11 |
| 10 01 | 011 010 | 100 101 | 9 | 0 011 01 | 1 100 10 |
| 10 10 | 011 100 | 100 011 | A | 0 011 10 | 1 100 01 |
| 10 11 | 011 110 | 100 011 | B | 0 011 11 | 1 100 00 |
| 11 00 | 111 000 | 000 111 | C | 0 111 00 | 1 000 11 |
| 11 01 | 111 010 | 000 101 | D) | 0 111 01 | 1 000 10 |
| 11 10 | 111 100 | 000 011 | E | 0 111 10 | 1 000 01 |
| 11 11 | 111 110 | 000 001 | F | 0 111 11 | 1 000 00 |

←------←------- direction of transmission -------→------→

Rule 9b is more favorable for simple decrementing during transmission with LSB first, because in this case, in order to avoid the non-data code word 010101 or 101010, after a "6" a level change always has to be avoided. Now, the following general rules apply for the selection of the code:

1. if incrementing or decrementing is to take place, transmission is to be made with LSB first
2. incrementing is more favorable according to rule 9 or 9.a
3. decrementing is more favorable according to rule 9.or 9.c
4. if arbitrating is to take place, transmission is to be made with MSB first
5. arbitrating is more favorable according to rule 9 or 9.a
6. the type of coding may be changed at will if it is known at which position using which code the work is to proceed.

In order to avoid code word 010101 or 101010, the rules in the following table are to be kept:

| function | direction | coding rule | rule: no level change | follow-up rule: level change for balanced code words |
|---|---|---|---|---|
| increment | LSB first | 9 | before "D" | necessary after D |
| increment | LSB first | 9.a | after "9" | — |
| decrement | LSB first | 9.b | after "6" | — |
| decrement | LSB first | 9.c | before "D" | necessary after D |
| arbitration | MSB first | 9 | after "A" | — |

What is claimed is:

1. A method for generating codes for transmission of data via a communications system having at least two subscribers, comprising:
   receiving, by a first subscriber, at least one data word and forwarding the data word or an at least partially changed data word to at least one second subscriber, data of the data word being represented as bits which are able to assume two different values, wherein at least one set of two bits of the data are coded in at least one set of three bits in such a way that, in the three coded bits, always at least two bits of a same value succeed one another; and
   after receiving one or two of the three coded bits, deciding which first code bit is to be emitted.

2. The method as recited in claim 1, wherein transmission of the coded data begins with a lowest-valued bit of a data word, and wherein the method further comprises:
   incrementing at least single bits of at least one data.

3. The method as recited in claim 1, wherein transmission of the coded data begins with a lowest-valued bit of a data word, and wherein the method further comprises:
   decrementing at least single bits of at least one data word.

4. The method as recited in claim 1, wherein transmission of the coded data begins with a highest-value bit of a data word, and wherein the method further comprises:
   comparing at least single bits of at least one received data word to those of a second data word; and
   outputting a comparison result, the comparison result being used for a selection of at least one data word to be transmitted.

5. The method as recited in claim 1, wherein at least two bits at a time are coded in three bits, and all remaining bits of a data word are transferred uncoded.

6. The method as recited in claim 1, wherein all bits of a data word are coded in three bits using two bits at a time, the data word having a bit number that is a multiple of two.

7. The method as recited in claim 1, wherein:
   transmission of the coded data begins with a lowest-valued bit of a data word, and an incrementing of at least single bits of at least one data word is carried out;
   transmission of the coded data begins with a lowest-valued bit of a data word, and a decrementing of at least single bits of at least one data word is carried out;
   transmission of the coded data begins with a highest-valued bit of a data word, and a comparison is made of at least single bits of at least one received data word to those of a second data word, a comparison result being output which is used for a selection of at least one data word to be transmitted; and
   a switchover takes place between the incrementing, the decrementing and the comparison, and thus between a beginning at the highest-valued bit of a data word and a beginning at the lowest-valued bit of a data word.

8. The method as recited in claim 1, wherein:
   transmission of the coded data begins with a lowest-valued bit of a data word, and an incrementing of at least single bits of at least one data word is carried out;
   transmission of the coded data begins with a lowest-valued bit of a data word, and a decrementing of at least single bits of at least one data word is carried out; and
   wherein a switchover takes place between the incrementing and the decrementing, and thus between a way of the coding of the data word, but the transmission always begins with the lowest-valued bit of the data word.

9. The method as recited in claim 7, wherein the switchover takes place as a function of a position of at least one bit in a data word or in a data frame.

10. The method as recited in claim 8, wherein the switchover takes place as a function of a position of at least one bit in a data word or in a data frame.

11. The method as recited in claim 7, wherein the switchover takes place as a function of at least one identifier in a data word or in a data frame.

12. The method as recited in claim 8, wherein the switchover takes place as a function of at least one identifier in a data word or in a data frame.

13. The method as recited in claim 1, wherein the forwarding step includes forwarding an inverse to the data word, and wherein a group select bit is transmitted for identification of a type of transmission.

14. The method as recited in claim 1, further comprising: providing non-data words which correspond to no coded data, the additional data being control data.

15. A device for generating codes in the transmission of data via a communications system, the data being represented as bits which are able to assume two different values, the device comprising:
a coding device configured to code at least one set of two bits of a data word in at least one set of three bits so that always at least two bits of a same value follow each other and so that after reception of one or two of the three coded bits of the data word that is to be forwarded, it decides which first code bit is to be emitted.

16. A subscriber of a communications system, comprising:
a device for code generation for data transmission in the communications system, the data being represented as bits which are able to assume two different values, the device including a coding device configured to code at least one set of two bits of a data word in at least one set of three bits, so that always at least two of the bits that follow each other are of a same value, wherein after reception of one or two of the three coded bits of the data word that is to be forwarded, it is decided which first code bit is to be output.

17. A data carrier storing a computer program, the computer program, when executed by a computer, causing the computer to perform the following steps:
receiving, by a first subscriber, at least one data word and forwarding the data word or an at least partially changed data word to at least one second subscriber, data of the data word being represented as bits which are able to assume two different values, wherein at least one set of two bits of the data are coded in at least one set of three bits in such a way that, in the three coded bits, always at least two bits of a same value succeed one another; and after receiving one or two of the three coded bits, it can already be decided which first code bit is to be emitted.

18. A computer program, the computer program, when executed by a computer, causing the computer to perform the following steps:
receiving, by a first subscriber, at least one data word and forwarding the data word or an at least partially changed data word to at least one second subscriber, data of the data word being represented as bits which are able to assume two different values, wherein at least one set of two bits of the data are coded in at least one set of three bits in such a way that, in the three coded bits, always at least two bits of a same value succeed one another; and after receiving one or two of the three coded bits, it can already be decided which first code bit is to be emitted.

* * * * *